United States Patent [19]
Gur Ali et al.

[11] Patent Number: 5,914,884
[45] Date of Patent: Jun. 22, 1999

[54] METHOD FOR EVALUATING MOLDABILITY CHARACTERISTICS OF A PLASTIC RESIN IN AN INJECTION MOLDING PROCESS

[75] Inventors: Fatma Ozden Gur Ali, Schenectady; Yu-To Chen, Niskayuna, both of N.Y.

[73] Assignee: General Electric Company, Schenectady, N.Y.

[21] Appl. No.: 08/778,433

[22] Filed: Jan. 2, 1997

[51] Int. Cl.$^6$ .......................... B29C 45/80; B29C 45/76; G06F 19/00; G06F 15/18

[52] U.S. Cl. ............................ 364/475.05; 364/475.02; 364/475.09; 364/148.02; 264/40.1; 264/328.1; 425/135

[58] Field of Search ................ 364/475.05, 475.02, 364/475.09, 148.02; 264/328.1, 40.1; 425/135

[56] References Cited

U.S. PATENT DOCUMENTS

| | | | |
|---|---|---|---|
| 4,797,242 | 1/1989 | Fukuda et al. ........................... | 264/108 |
| 4,989,166 | 1/1991 | Akasaka et al. ......................... | 364/578 |
| 5,035,598 | 7/1991 | Fujita et al. ............................ | 425/144 |
| 5,225,122 | 7/1993 | Inaba et al. .......................... | 364/475.05 |
| 5,550,744 | 8/1996 | Steinbichler ......................... | 364/476.01 |
| 5,671,335 | 9/1997 | Davis ........................................ | 395/23 |
| 5,704,011 | 12/1997 | Hansen ...................................... | 395/22 |
| 5,727,128 | 3/1998 | Morrison ................................... | 395/10 |

*Primary Examiner*—James P. Trammell
*Assistant Examiner*—Cuong H. Nguyen
*Attorney, Agent, or Firm*—David C. Goldman; Marvin Snyder

[57] ABSTRACT

A method for evaluating moldability characteristics of a plastic resin in an injection molding process. A vital few process response variables are determined from a plurality of process response variables that are used to characterize the injection molding process. The vital few process response variables control a plurality of quality characteristics that are used to characterize a molded product made from the plastic resin. An empirical model is then developed describing the relationship between the vital few process response variables and the plurality of quality characteristics. The empirical model is then trained with experimental data taken from injection molding process runs using new grades of the plastic resin. The trained empirical model is then used to evaluate the moldability characteristics of new grades of the plastic resin.

13 Claims, 11 Drawing Sheets

METHOD FOR EVALUATING MOLDABILITY CHARACTERISTICS OF A PLASTIC RESIN IN AN INJECTION MOLDING PROCESS

BACKGROUND OF THE INVENTION

The present invention relates generally to an injection molding process and more particularly to a method for evaluating moldability characteristics of a plastic resin in an injection molding process.

An injection molding process is one of the most common ways of producing parts and products from plastic resin pellets. In an injection molding process the plastic resin pellets are changed into a viscous material and forced under pressure into a mold of a desired shape. The viscous material is then held under pressure in the mold until it solidifies. Afterwards, the mold is opened and the molded object is ejected. During the injection molding process several variables are measured. The variables are responses to the plastic resin and the injection molding process. In an injection molding process there may be than sixty process response variables that are measured by taking various sensor readings during the process. After the injection molding process has ended, sometimes several quality characteristics are measured on each part in order to determine if the part meets product requirements. The quality characteristics are dependent upon the process response variables. However, the relationship between the process response variables and the quality characteristics for a given resin in an injection molding process is very complicated because of the many variables involved in the process.

Before a new grade of a plastic resin material can be introduced in an injection molding process it is necessary to develop an understanding on the relationship between the process response variables and the quality characteristics. Currently, the only way to determine if a plastic resin can be used in an injection molding process is by physically producing a product in an injection molding process and determining whether the molded product meets the product requirements. If the product does not meet the requirements, then the plastic has to be molded again under different operating conditions. This process continues until the plastic can mold a product that meets specified requirements. This trial and error approach is very time consuming and costly. If one was able to develop a model describing the relationship between the process response variables and the quality characteristics, then a designer would be able to determine how well a new grade of plastic resin could be molded and under what conditions would the resin be able to produce a product that meets the specification requirements. Therefore, there is a need to be able to develop a model describing the relationship between the process response variables and the quality characteristics for a particular plastic resin in an injection molding process so that the model can be used to evaluate whether a new grade of plastic resin can be used to produce a product built to specification requirements.

SUMMARY OF THE INVENTION

Accordingly, it is a primary objective of the present invention to provide a method for developing a model describing the relationship between the process response variables and the quality characteristics for a particular plastic resin in an injection molding process.

Another objective of the present invention is to provide a method that uses the model to evaluate moldability characteristics of the plastic resin in an injection molding process.

Still another objective of the present invention is to provide a method that uses the model to evaluate moldability characteristics of a new grade of the plastic resin in an injection molding process.

Thus, in accordance with the present invention, there is provided a method for evaluating moldability characteristics of a plastic resin in an injection molding process. In the present invention, a vital few process response variables are determined from a plurality of process response variables that are used to characterize the injection molding process. The vital few process response variables control a plurality of quality characteristics that are used to characterize a molded product made from the plastic resin. An empirical model is then developed describing the relationship between the vital few process response variables and the plurality of quality characteristics. The empirical model is then trained with experimental data taken from injection molding process runs using new grades of the plastic resin. The trained empirical model is then used to evaluate the moldability characteristics of new grades of the plastic resin.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
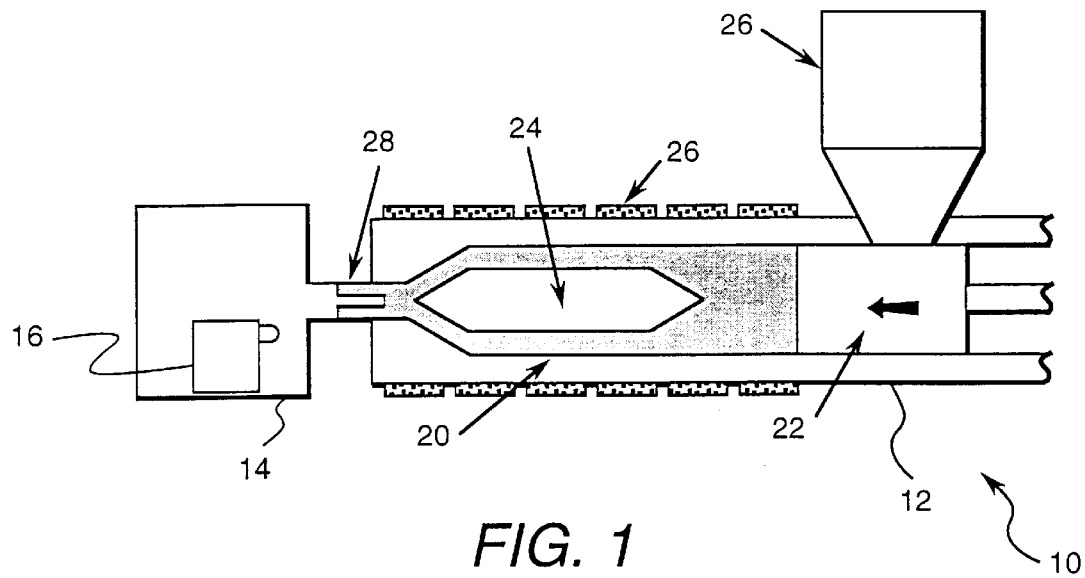
FIG. 1 is a schematic illustration of a standard injection molding machine.

A standard injection molding machine has two major units, an injection unit and a molding unit. FIG. 1 shows a schematic illustration of a standard injection molding machine 10. The injection molding machine 10 comprises an injection unit 12 and a molding unit 14. The injection unit 12 injects plastic resin into the molding unit 14 where a part 16 such as a cup is molded. A feed hopper 18 is used to supply plastic resin pellets into the injection unit 12. The plastic resin pellets are fed into a chamber 20 when an injection ram 22 is in a withdrawn position. After the resin pellets have been fed into the chamber 20, then the injection ram 22 forces the pellets through a spreader unit 24 which is heated by several heating units 26. The plastic resin pellets are then melted in the spreader unit 24 through a combination of heat and pressure. When the injection ram 22 forces the unmelted plastic resin around the spreader unit 24, the melted resin already in the spreader is pushed forward. Increased pressure from the movement of the injection ram 22 causes the melted plastic to flow through a nozzle 28 into the molding unit 14. Pressure is maintained until the mold cavity is full and the resin has solidified. The pressure is then released and the mold is open when the part 16 is entirely solid.

Figure 2:
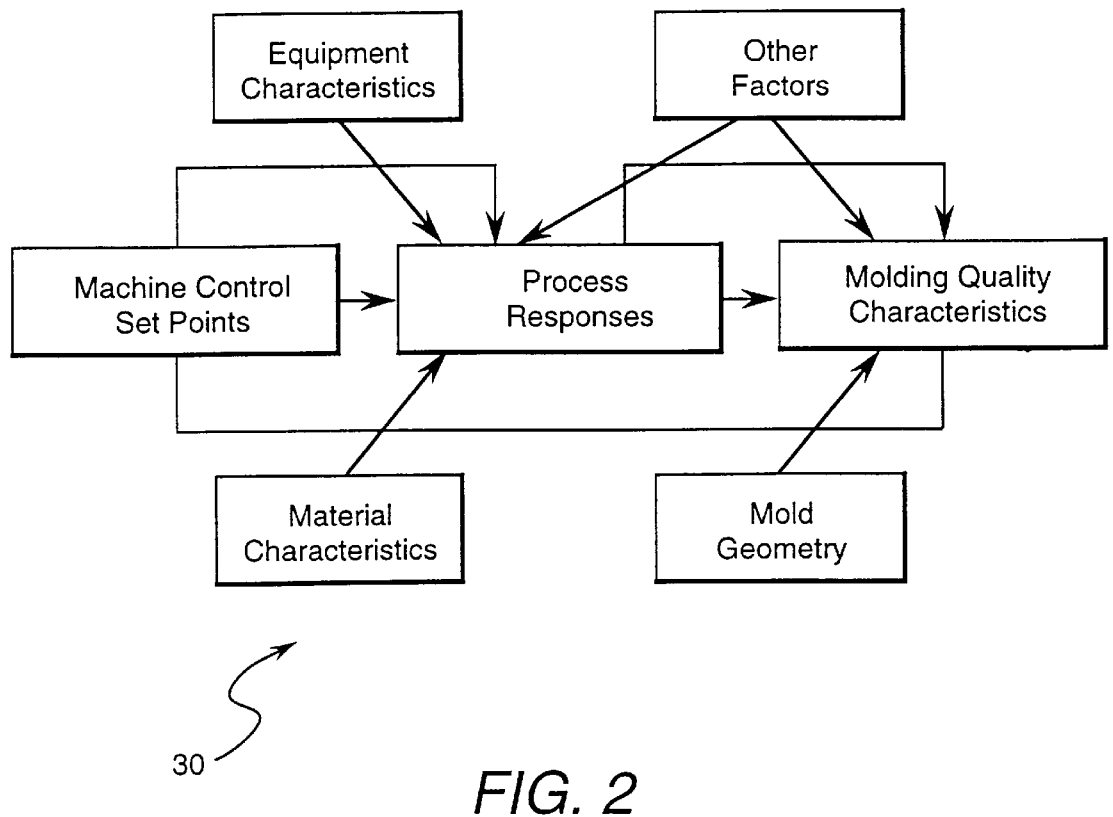
FIG. 2 is an overview of the factors and relationships that are involved in an injection molding process.

In order to develop a model between the process response variables and the quality characteristics, it is necessary to have an understanding of the factors and relationships that are involved in an injection molding process. FIG. 2 provides an overview 30 of the factors and relationships that are involved in an injection molding process. Basically, the process response variables in an injection molding process are dependent on injection molding machine control set points, equipment characteristics, plastic resin material characteristics, and other environmental factors. The quality characteristics are dependent on the process response variables, the geometry of the mold, and the other environmental characteristics. Therefore, in order to develop a model between the process response variables and the quality characteristics, the type of injection molding machine operating under various settings and the type of plastic resin have to be taken into account. All of these variables are a reason why developing a model between the process response variables and the quality characteristics is complex.

Figure 3:
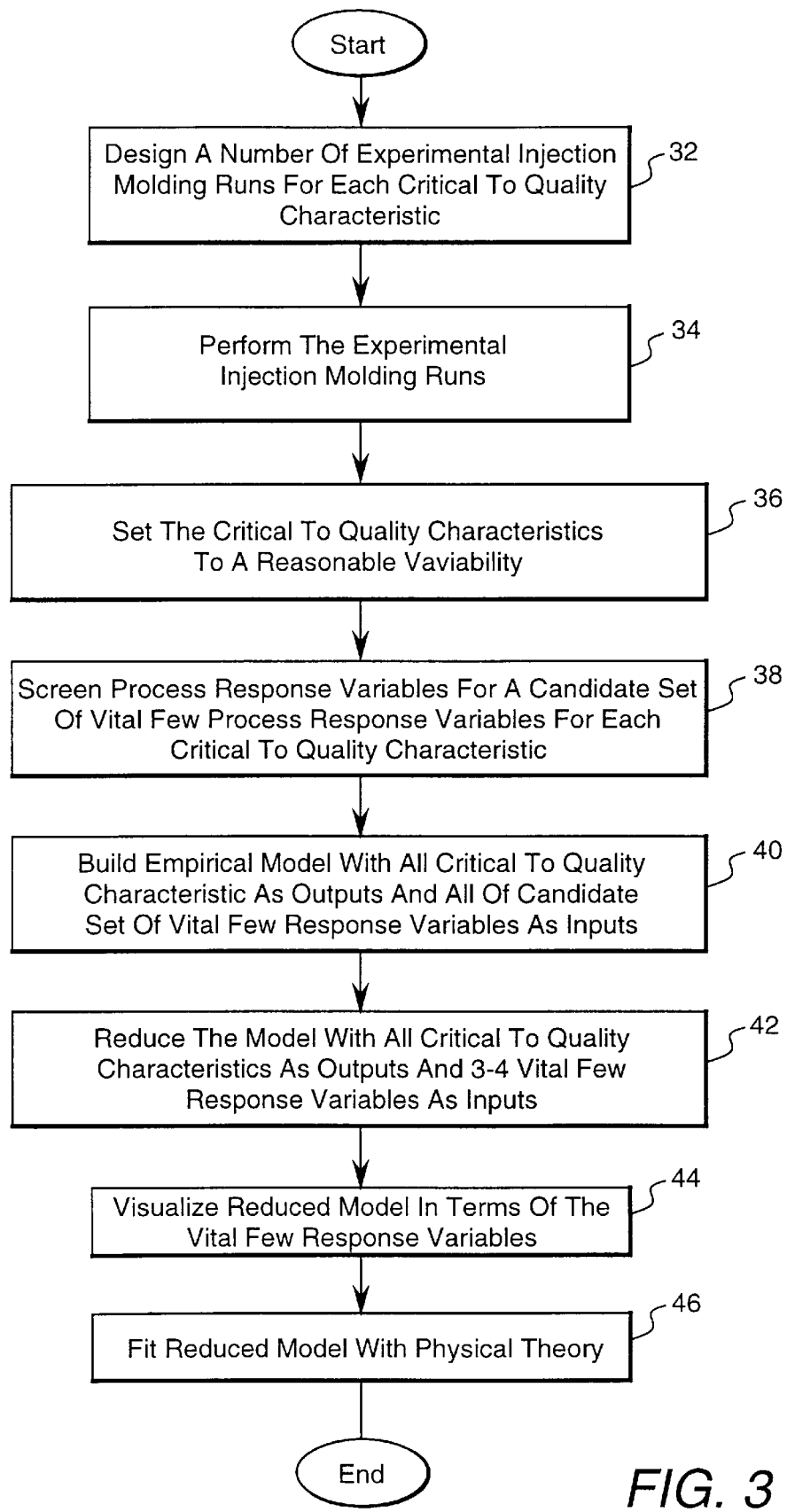
FIG. 3 is a flow chart setting forth the steps used to derive a vital few process response variables from the process response variables according to the present invention.
Figure 4A:
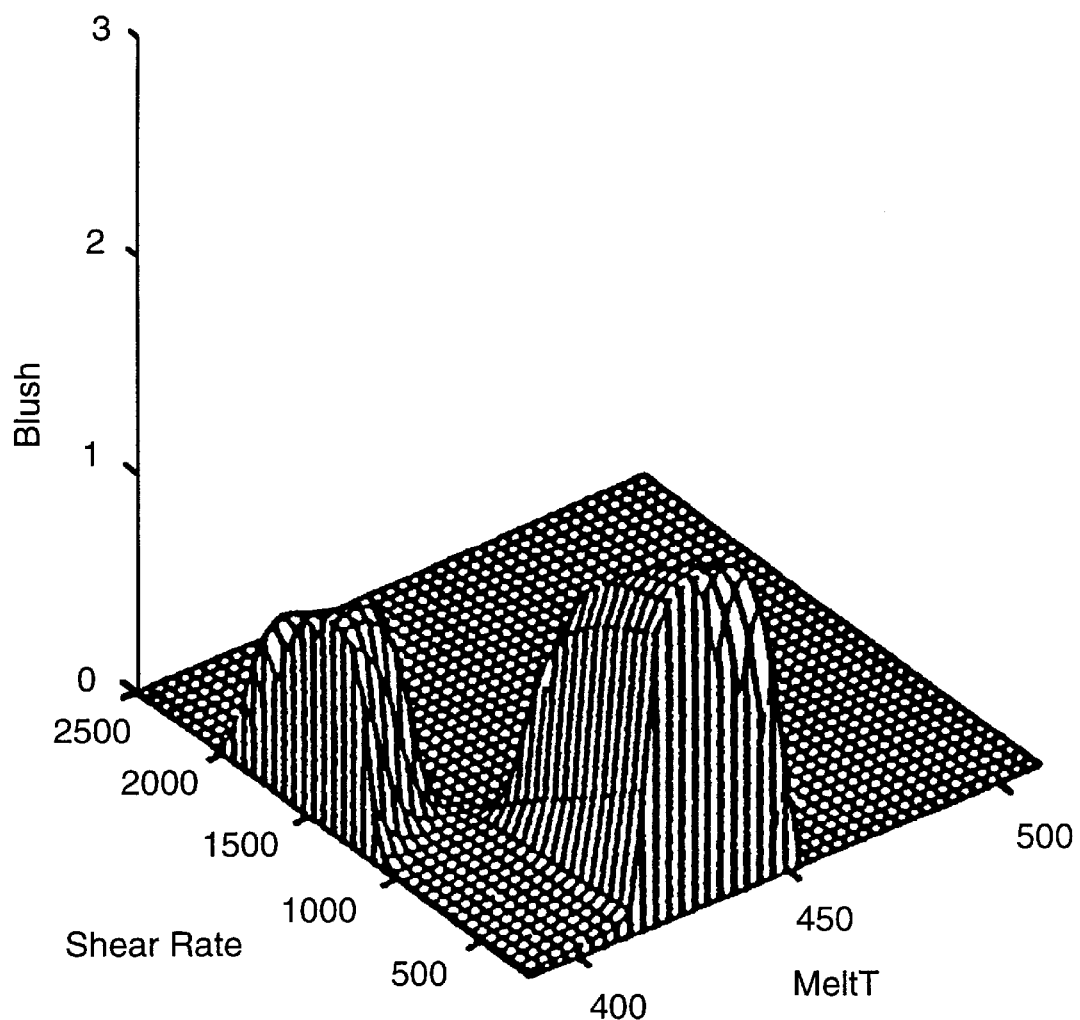
FIGS. 4a–4f show various examples of graphical visualizations for a model derived according to the present invention.
Figure 4B:
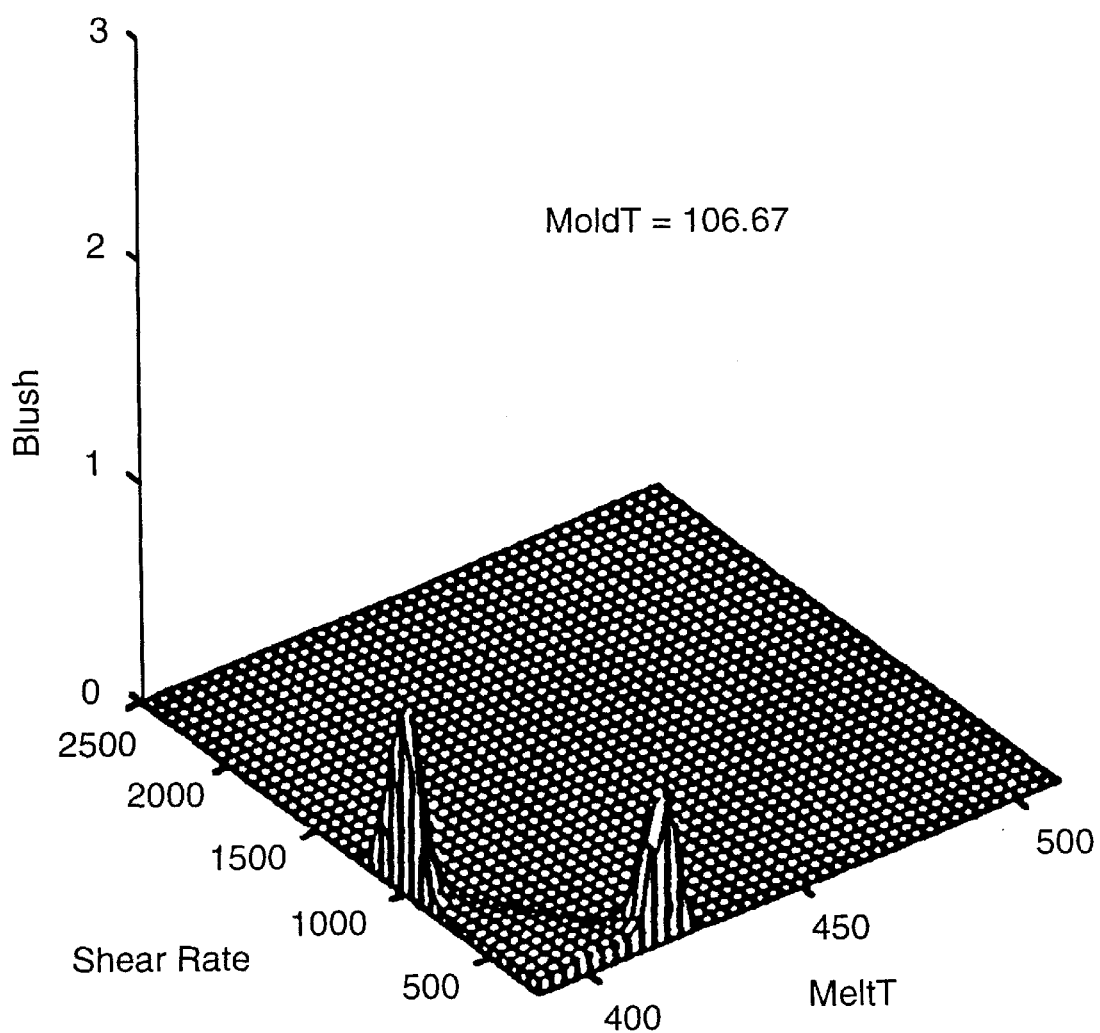
Figure 4C:
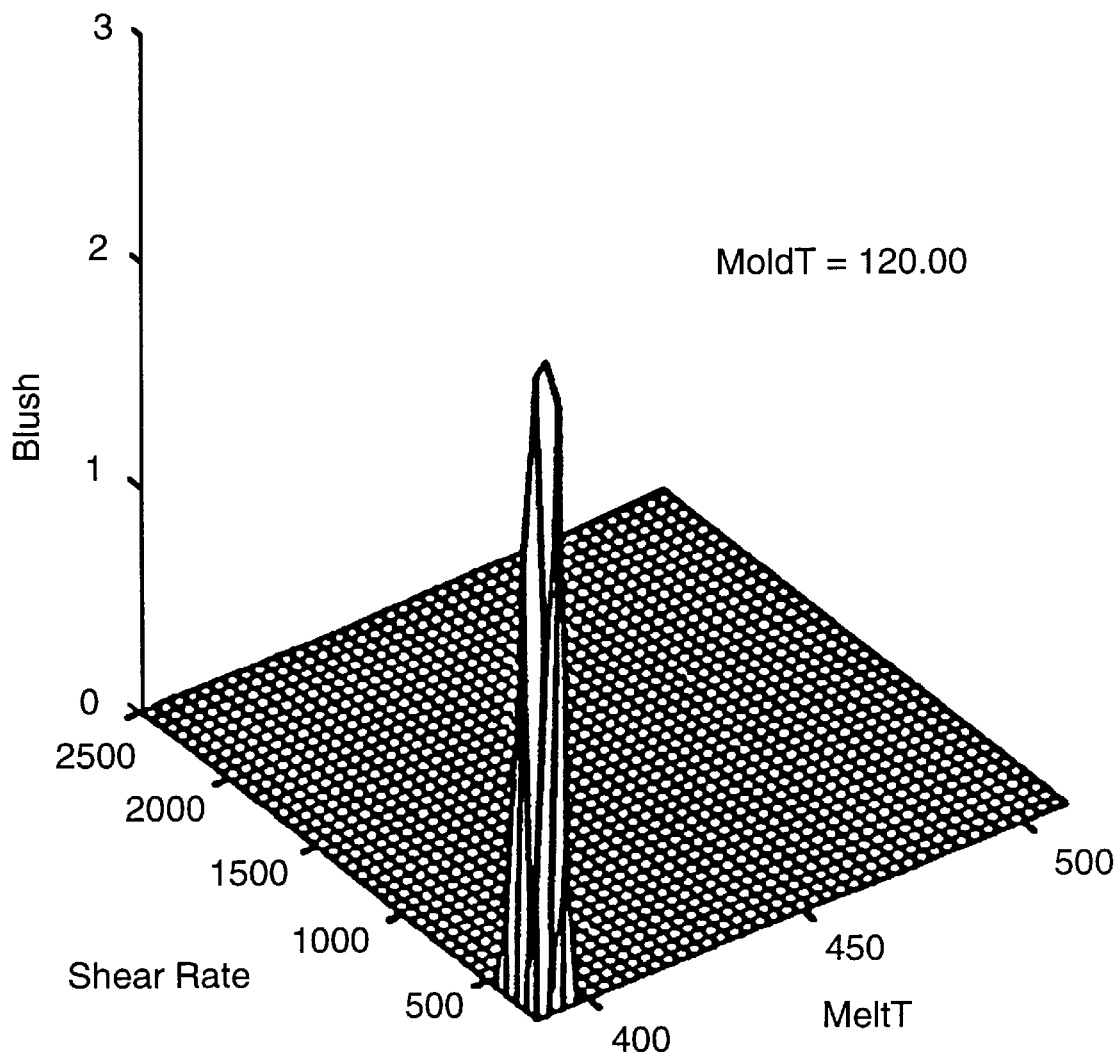
Figure 4D:
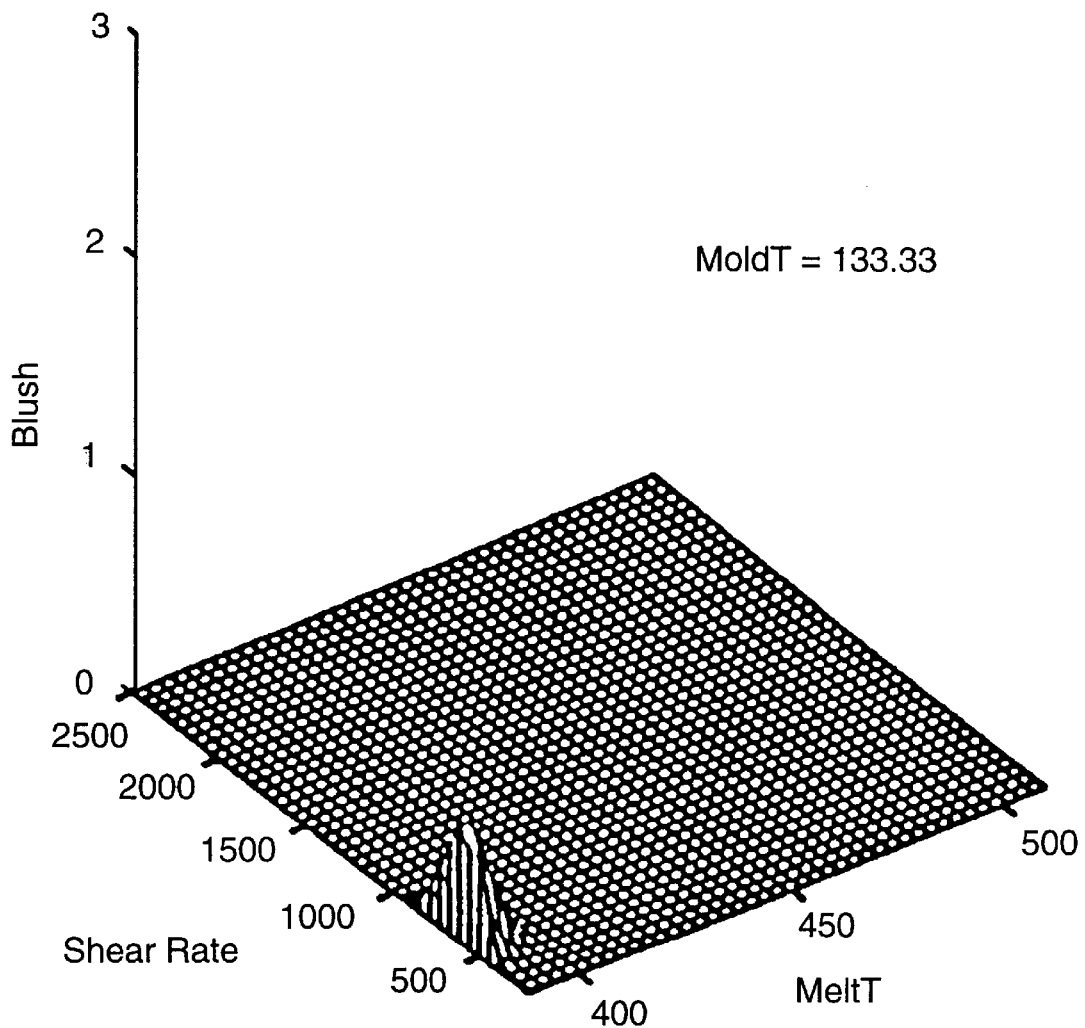
Figure 4E:
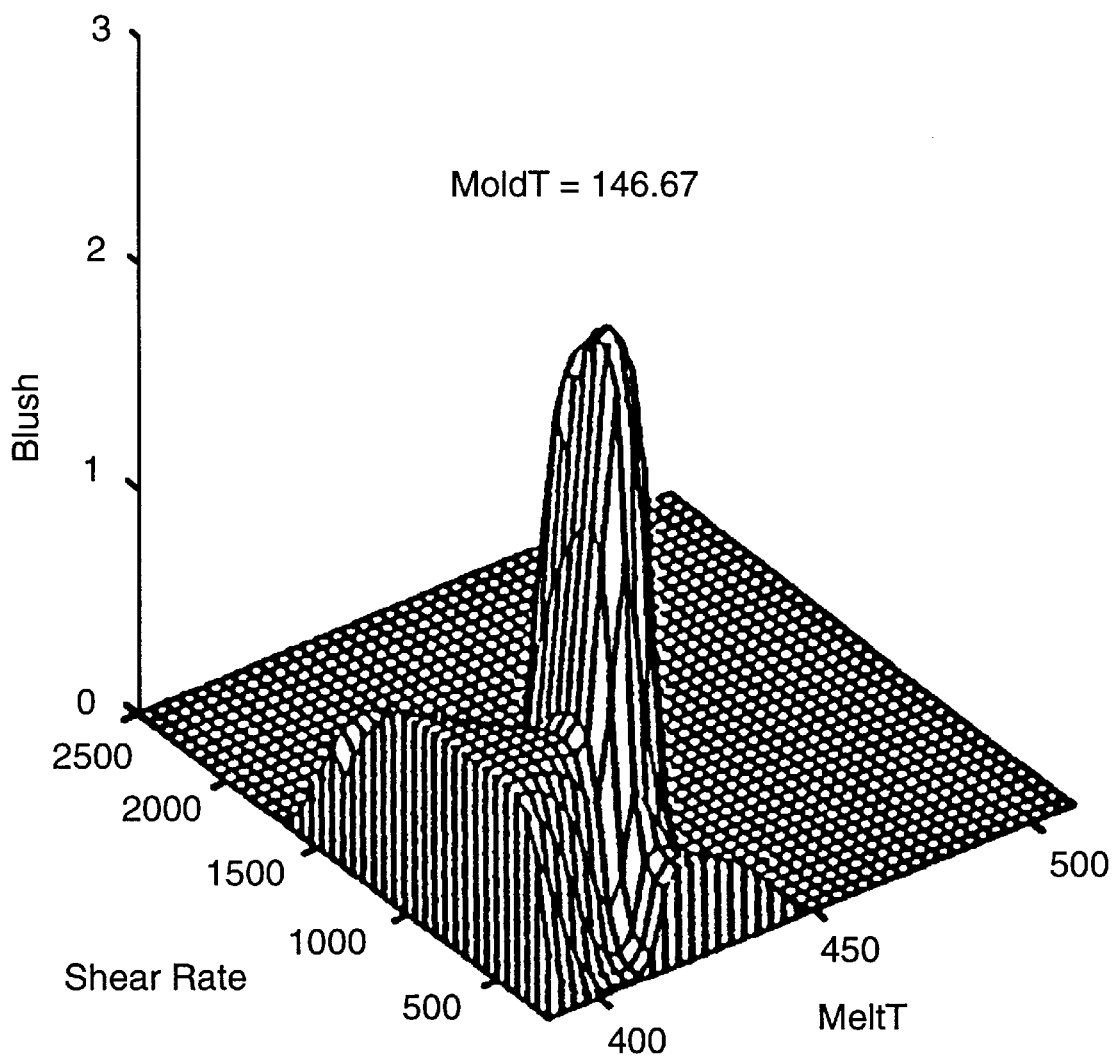
Figure 4F:
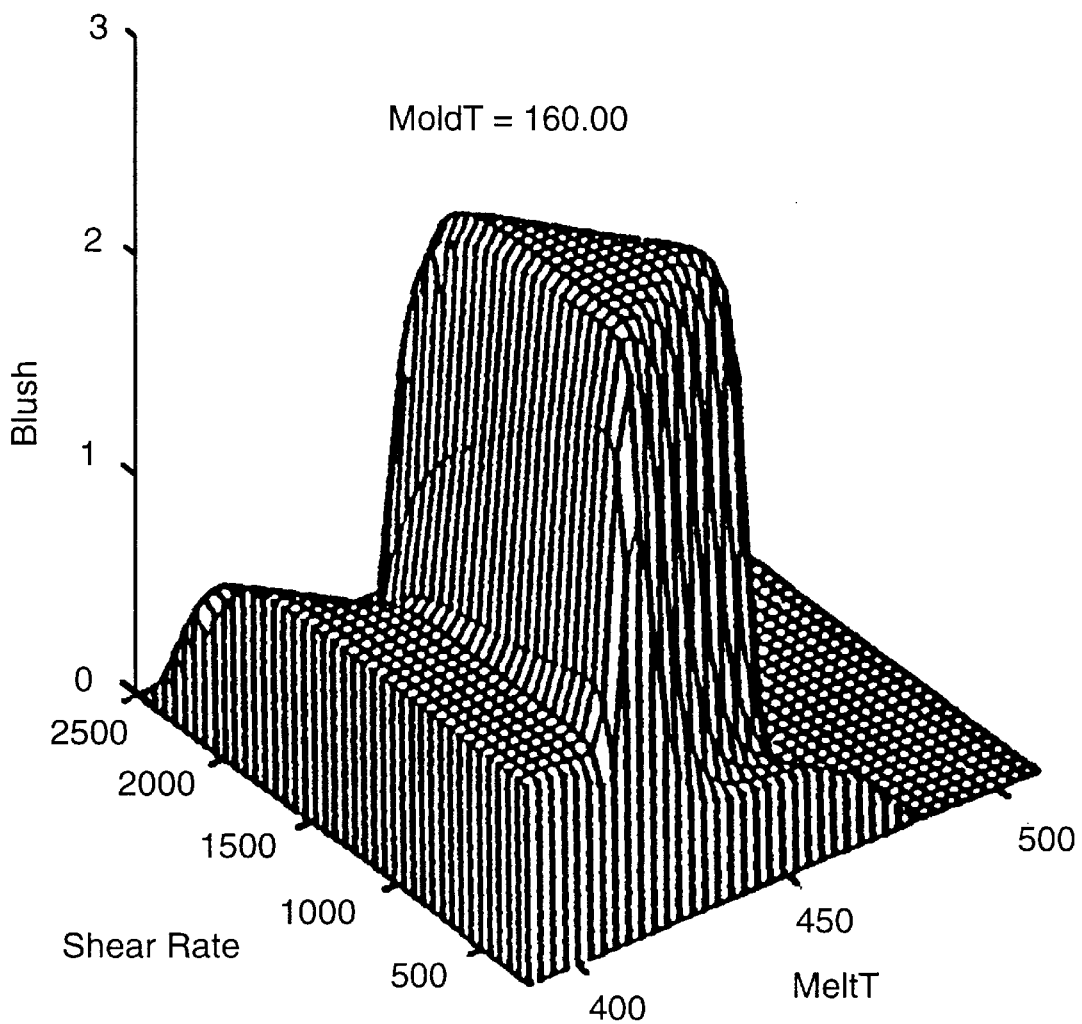

The complexity of developing the model between the process response variables and the quality characteristics can be reduced by determining which process response variables are vital to the quality characteristics. FIG. 3 provides a flow chart setting forth the steps used to derive a vital few process response variables from the process response variables according to the present invention. Initially at 32, a number of experimental injection molding runs for the plastic resin are designed in the machine set point space for each quality characteristic. In the illustrative embodiment, the machine set point space comprises the mold temperature, the barrel (i.e. the chamber) temperature, the injection velocity, the hold time, the cooling time, and the number of gates. The quality characteristics that are measured for a plastic resin in the illustrative embodiment comprise blush, burn, short shot, and shrinkage in the length, width, and height dimensions. Blush and burn indicate the appearance characteristics of the part, short shot indicates whether the mold is completely filled with plastic, and shrinkage indicates whether the part has the right dimensions.

The experimental injection molding runs are performed in the machine set point space and the process response variables and quality characteristics are measured at 34. Some of the process response variables that are measured are the viscosity at the nozzle, the shear rate, the melt temperature, and the melt pressure. Note that this is only a limited list of the process response variables that may be measured. It is ensured that each of the quality characteristics within experimental runs have a reasonable variability at 36. A reasonable within run variability for the blush, burn, short shot, and shrinkage characteristics would be considerably less than run to run variability in these quality characteristics.

The data taken from the experimental runs are then used to screen a candidate set of vital few process response variables from the measured process response variables for each of the quality characteristics at 38. The screening is performed by examining the data accumulated from the experimental runs and using graphical exploration techniques to visualize a correlation among the process response variables and a correlation between the process response variables and each of the quality characteristics. In particular, linear correlations between the process response variables and each of the quality characteristics are determined by using a linear regression. The important nonlinear correlations between the process response variables and the quality characteristics are determined by using classification and regression trees (CART), C4.5, and pairways plots. CART and C4.5 are data mining algorithms that fit a response surface by partitioning the data repeatedly according to a greedy algorithm and assigning the outcome class or regression value for each partition. These algorithms result in a tree where the branching is according to explanatory variables and the leaves are the value of the output variable. The upper four levels of trees are values of the candidate set of vital few variables, as well as the ones that were significant in the linear regression. At each level of correlation it is helpful to incorporate the knowledge of artisans skilled in the art of injection molding to ensure that the vital few process response variables are determined.

After the candidate set of vital few process response variables for each quality characteristic has been determined (i.e., seven to eight variables), then an empirical model between all of the candidate sets of vital few process response variables and the quality characteristics is built at 40. The empirical model is built with a processor by using linear models (i.e., linear regression) or nonlinear models (i.e., nonlinear regression of 2nd order and neural network) to determine how many of the candidate sets of vital few process response variable explain the relationship with the quality characteristics. The empirical models are built with all of the quality characteristics as outputs and all of the candidate set of vital few process response variables as inputs. The empirical models then successively reduce the candidate sets at 42 until there are three to four vital few process response variables remaining, while at least 70–80 percent of variability is explained. The model that provides the least amount of vital few process response variables and that explains the greatest amount of variability is the model that will be used.

After the model has been built then it is visualized on a display at 44 in terms of the vital few process response variables and the quality characteristics. Visualizing the model is helpful because it reveals what the model has learned from the experimental data and leads to a physical explanation. Examples of various visualizations for a model set of different set points (i.e., mold temperature) are shown in FIGS. 4a–4f. In these visualizations, the higher the surface, the worse the quality characteristic (i.e., blush). For example, in FIG. 4f, when the mold temperature is 160, the shear rate is 2000, and the melt temperature is 450, then the blush is two. Referring back to FIG. 3, the visualized model is then used to construct a model that corresponds to physical theory at 46. Fitting the model to correspond to physical theory includes creating new process response variables that correspond to the functions of the vital few process response variables such that they have physical meaning. The new variables then are fitted to the model using nonlinear optimization techniques with constraints that reflect specific physical limitations.

Figure 5:
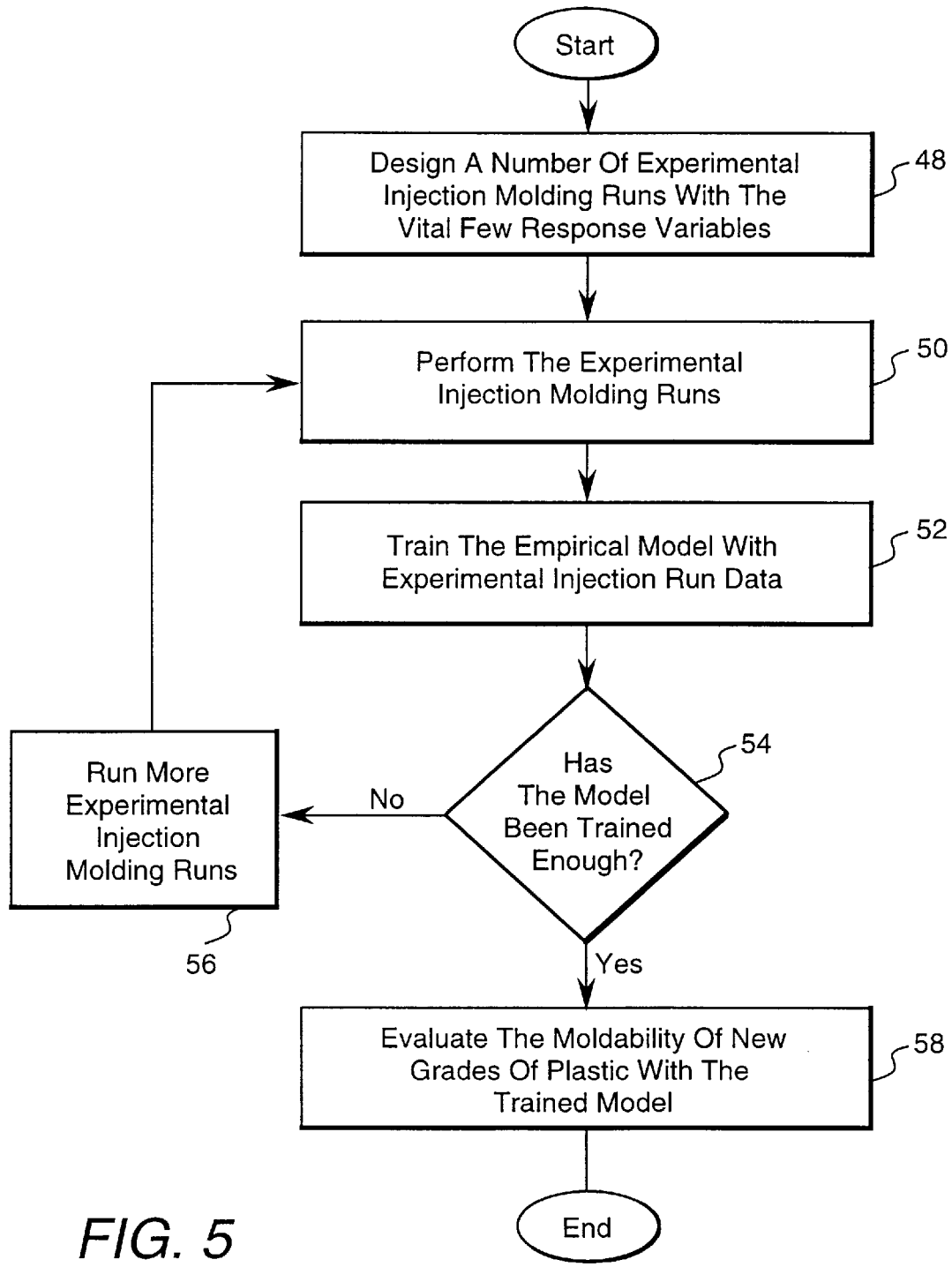
FIG. 5 provides a flow chart setting forth the steps used to determine the moldability of new grades of plastic material according to the present invention.

After the model has been fitted then it can be used on new grades of the plastic material to evaluate their moldability. FIG. 5 provides a flow chart setting forth the steps used to determine the moldability of new grades of the plastic material according to the present invention. Initially at 48, a number of experimental injection molding runs for the new grade of plastic resin are designed with the 3–4 vital few process response variables. In the illustrative embodiment, the vital few process response variables are the viscosity at the nozzle, the hold pressure, and the melt temperature. The experimental runs are performed at 50 and the data taken from the experimental runs are then used to train the empirical model derived in FIG. 3 at 52. At 54, it is determined whether the empirical model has been trained enough to explain the relationships between process response variables and quality characteristics for the new grade of plastic resin material. If the model has not been trained enough then more experimental runs are set at 56 and performed at 50 and trained again at 52. These steps are repeated until the model has been adequately trained.

Once the model has been adequately trained, then it is used to evaluate the moldability of the new grade of the plastic resin at 58. One moldability characteristic that is evaluated is the best quality optimizer or the region of operation that provides the best quality. This determination is summarized in equation 1:

$$\min\left[\sum_i w_i \times f_i(x)\right] s \cdot t \cdot g(x) < 0 \quad (1)$$

wherein $w_i$ is the weight given to quality characteristic i, $f_i$ is the function (i.e., the model) that maps process response variables to quality characteristic i, x is the vector of process response variables, and g(x) is the feasibility constraints for the process response variables. The constraints for g(x) are shown in equations 2 and 3:

$$\text{Viscosity} = A \times \exp\left(\frac{T_0}{T_{melt}}\right) \times \frac{1}{1 + \left(\frac{A \times \exp\left(\frac{T_0}{T_{melt}}\right) \times \text{Shear Rate}}{\tau^*}\right)^{n-1}} \quad (2)$$

$$\text{Shear Rate} = C \times \text{Injection Speed} \quad (3)$$

wherein A, $T_0$, $\tau^*$, and n are material dependent constants, C is a machine dependent constant, and Viscosity, $T_{melt}$, Shear Rate, and Injection Speed are all process response variables. In essence, this determination minimizes the weighted sum of individual quality defects. Note that $w_i$, the weighting function, has to be provided by the user. Basically, $w_i$, specifies the relative importance between individual quality characteristics. Genetic algorithms or nonlinear optimization techniques may be used for determining the minimization of $$\min\left[\sum_i w_i \times f_i(x)\right].$$

The output of the genetic algorithm is the optimal vector of x, denoted as x*, that the settings of the vital few process response variables give the minimum value of $$\left[\sum_i w_i \times f_i(x)\right].$$

Figure 6A:
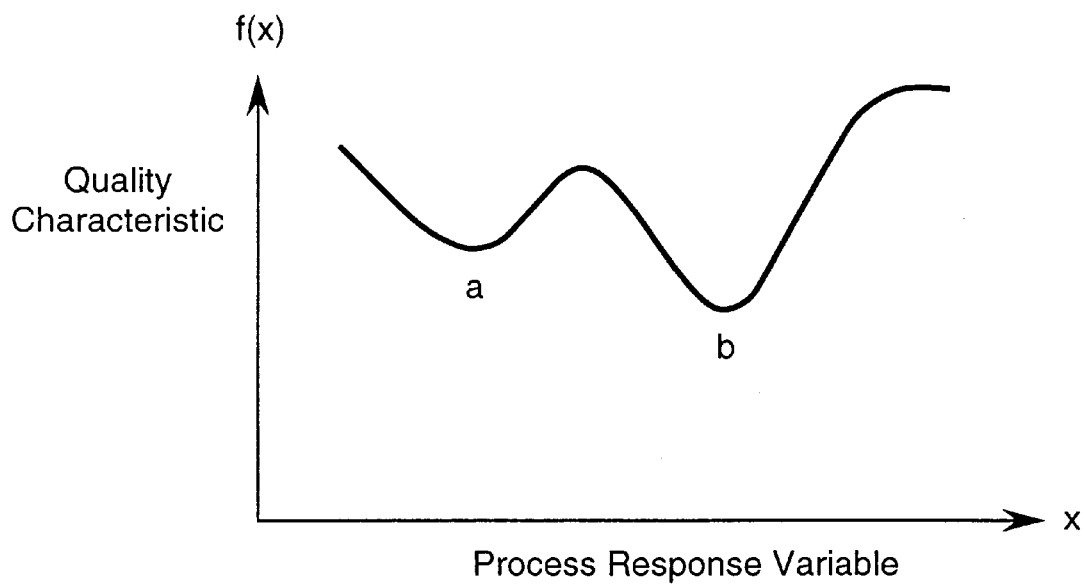
FIGS. 6a–6d graphically illustrate some of the moldability characteristics that are determined according to the present invention.

Note that all of the quality characteristics are defect types of quality measurements. That is the smaller the value, the better the quality. The best quality optimizer determination is illustrated in FIG. 6a. In FIG. 6a, the x-axis is the process response variable, x, and the y-axis is the quality characteristic, f(x). The best quality optimizer is the minimum point on the curve. In FIG. 6a, point b has a smaller f(x) value than the point. Therefore, point b is denoted as the best quality optimizer.

Figure 6B:
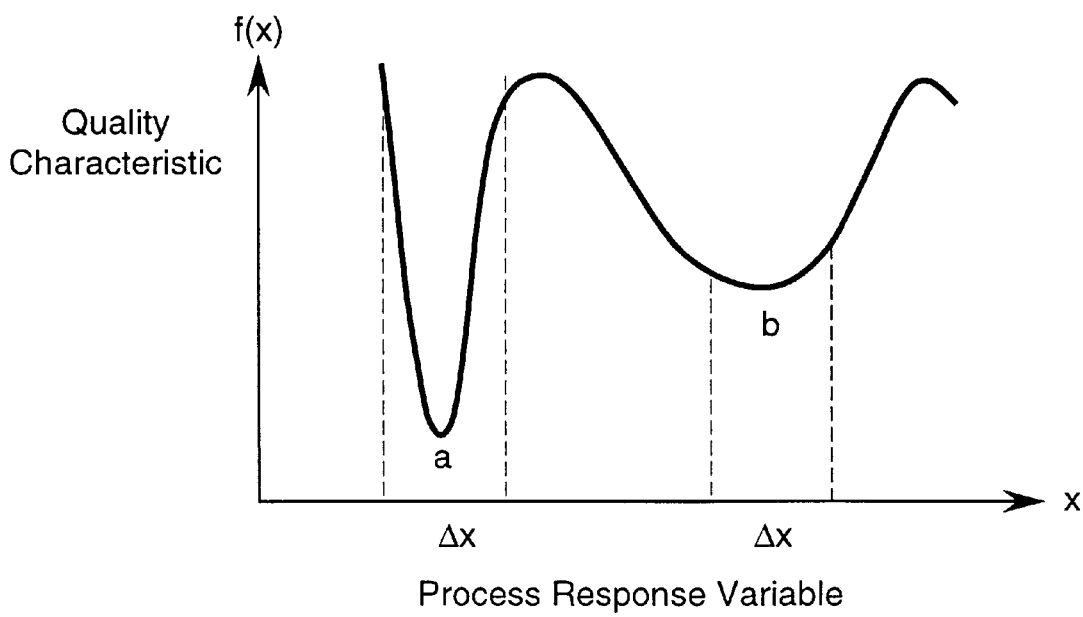

Another moldability characteristic that is determined is the robust quality optimizer or the best regions of expected molding quality given likely shifts in the vital few process response variables. This determination is summarized in equations 4 and 5:

$$\min\left[\sum_i w_i \times p_{center} \times f_i(x) + \sum_{neighbor} p_{neighbor} \times f_i(x + \Delta x_{neighbor})\right] \quad (4)$$

$$s \cdot t \cdot g(x) < 0 \text{ and } \left(\sum_{neighbor} p_{neighbor}\right) + p_{center} = 1 \quad (5)$$

wherein $w_i$, $f_i$, x, and g(x) are the same as above, and $P_{center}$ is the fraction of time that x will be at the set values, and $p_{neighbor}$ is the fraction of time that x will off by $\Delta x_{neighbor}$. In essence, the determination minimizes the expected weighted sum of the quality characteristics, given that the deviation in the process response variables will be of certain magnitude and with certain probability. The robust quality optimizer determination is illustrated in FIG. 6b. In FIG. 6b, the x-axis is the process response variable, x, and the y-axis is the quality characteristic, f(x). The robust quality optimizer is the minimum point on the curve with as wide a bottom valley as possible on the curve. In FIG. 6b, region b has a wider trench on f(x) than that of region a. Although region a has smaller f(x) values than that of region b, it has a serious drawback due to its narrow trench. If a is perturbed by a length of $\Delta x/2$ on either direction, then its quality measurement, f, will increase dramatically. In other words, the operating region a is not robust against variations. On the other hand, region b shows good robustness because the quality measurement value f will be in an acceptable level even if a random perturbation is applied. Therefore, region b is denoted as the robust quality optimizer.

Figure 6C:
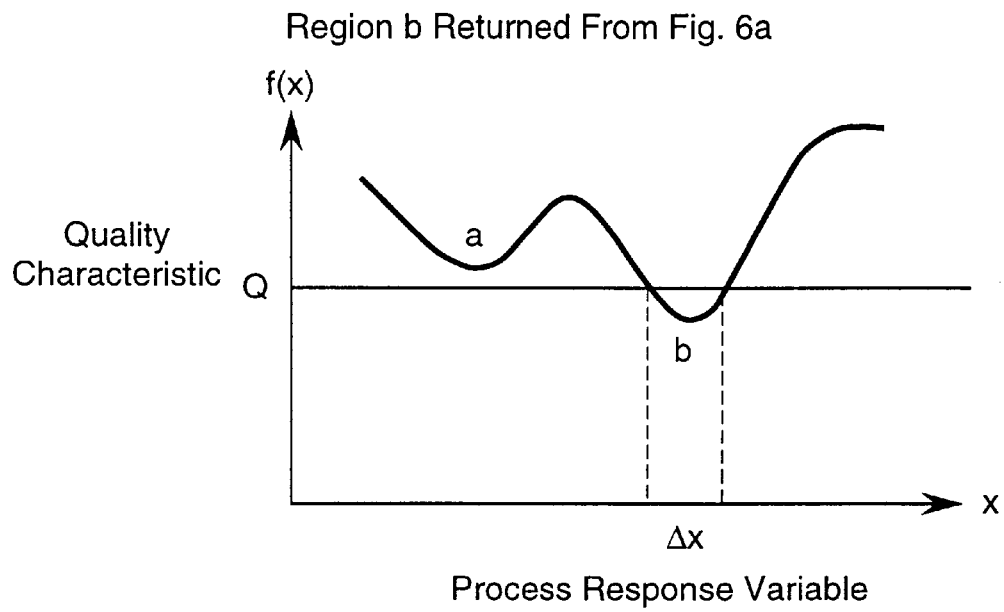
Figure 6D:
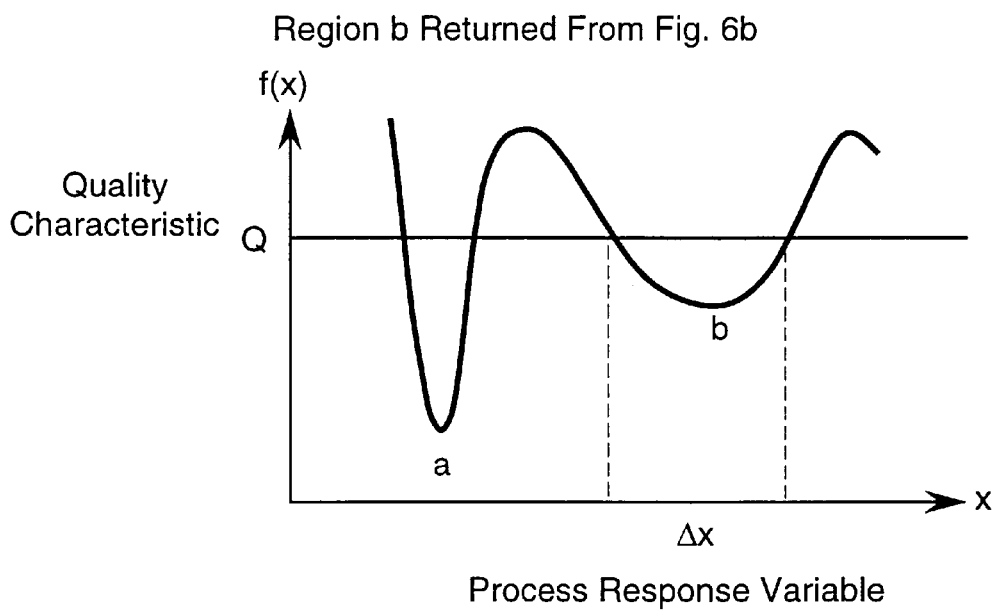

Another moldability characteristic that is determined is the operating window or the operating region that specifies a given level of quality for the vital few process response variables. This quantity helps in comparing materials in the size of the "sweet spot" that satisfies the quality requirements. This determination is summarized in equation 6:

$$\max\left[\sum_{neighbor} \Delta x_{neighbor}\right] s \cdot t \cdot f_i(x + \Delta x_{neighbor}) \leq Q_i \forall i,$$

neighbor and g(x) < 0 wherein $f_i$, g(x) is the same as above, and x is the operating region returned from either the best quality optimizer or the robust quality optimizer determinations. In this determination, $\Delta x_{neighbor}$ is the allowable variation in the process response variables, and $Q_i$ is the acceptable quality for the quality characteristic i. Basically, this determination maximizes the allowable variation in the process response variables, given the acceptable level in the quality characteristics. The operating region window determination is illustrated in FIG. 6c. In FIG. 6c, the x-axis is the process response variable, x, and the y-axis is the quality characteristic, f(x). The operating window is the maximum range associated with whatever minimum point is returned by using either the best quality optimizer or the robust quality optimizer determination, given the pre-defined quality specification for the plastic resin. In FIG. 6c there are two plots. Region b in the top plot is obtained from the best quality optimizer and region b in the bottom plot is obtained from the robust quality optimizer. Therefore, the operating window is dependent upon what method is chosen.

It is therefore apparent that there has been provided in accordance with the present invention, a method for evaluating moldability characteristics of a plastic resin in an injection molding process that fully satisfies the aims and advantages and objectives hereinbefore set forth. The invention has been described with reference to several embodiments, however, it will be appreciated that variations and modifications can be effected by a person of ordinary skill in the art without departing from the scope of the invention. For example, another moldability characteristic that can be determined is a sensitivity value that specifies a level of molding quality and sensitivity to unit change for a given vital process response variable. The best sensitivity value is found where the change in quality has the smallest value.

The invention claimed is:

1. A method for evaluating moldability characteristics of a plastic resin in an injection molding process, the method comprising the steps of:

determining a vital few process response variables from a plurality of process response variables used to characterize the injection molding process, the vital few process response variables controlling a plurality of quality characteristics used to characterize a molded product made from the plastic resin;

developing an empirical model describing the relationship between the vital few process response variables and the plurality of quality characteristics;

training the empirical model with experimental data taken from injection molding process runs using new grades of the plastic resin; and using the trained empirical model to evaluate moldability characteristics of new grades of the plastic resin, wherein the moldability characteristics comprise determining regions of operating an injection molding process that provides the best expected molding quality given likely shifts in the vital few process response variables.

2. The method according to claim 1, wherein the step of determining the vital few process response variables comprises conducting a plurality of experimental injection molding runs for the plastic resin under a variety of injection molding machine set points and measuring the plurality of process response variables during each of the injection molding runs and the plurality of quality characteristics of the molded resin after the injection molding runs.

3. The method according to claim 2, further comprising correlating the measurements of the plurality of process response variables with the measurements of each of the plurality of quality characteristics, the correlation providing a candidate set of vital few process response variables for each quality characteristic.

4. The method according to claim 3, wherein the correlation is a linear regression.

5. The method according to claim 4, wherein the linear regression is performed by a neural network.

6. The method according to claim 3, wherein the correlation is a nonlinear regression.

7. The method according to claim 6, wherein the nonlinear regression is performed by a neural network.

8. The method according to claim 3, further comprising reducing the candidate sets of vital few process response variables to a vital few process response variables that effect all of the plurality of quality characteristics.

9. The method according to claim 1, wherein the step of developing the empirical model comprises conducting a plurality of experimental injection molding runs for the plastic resin according to the vital few process response variables and measuring the vital few process response variables during each of the injection molding runs and the plurality of quality characteristics of the molded resin after the injection molding runs.

10. The method according to claim 9, further comprising correlating the measurements of the vital few process response variables with the measurements of each of the plurality of quality characteristics.

11. The method according to claim 10, wherein the correlation is performed by using a neural network.

12. The method according to claim 1, wherein the moldability characteristics further comprise determining a region of operating an injection molding process that provides the best quality for a grade of the plastic resin.

13. The method according to claim 1, wherein the moldability characteristics further comprise determining a region of operating an injection molding process that specifies a given level of quality in terms of the vital few process response variables.

* * * * *